US008950678B2

(12) United States Patent
Germaine et al.

(10) Patent No.: US 8,950,678 B2
(45) Date of Patent: Feb. 10, 2015

(54) BARCODE READER WITH EDGE DETECTION ENHANCEMENT (75) Inventors: Gennady Germaine, Cherry Hill, NJ (US); Tao Xian, Bordentown, NJ (US); Chen Feng, Snohomish, WA (US); Ynjiun Wang, Cupertino, CA (US); Xiaoxun Zhu, Suzhou (CN); Stephen Colavito, Garnet Valley, PA (US); Robert Blake, Woodbury Heights, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 494 days.

(21) Appl. No.: 12/948,394

(22) Filed: Nov. 17, 2010

(65) Prior Publication Data
US 2012/0118974 A1 May 17, 2012

(51) Int. Cl.
G06K 9/38 (2006.01)
G06K 7/10 (2006.01)
G06K 7/14 (2006.01)

(52) U.S. Cl.
CPC .......... *G06K 7/10851* (2013.01); *G06K 7/1452* (2013.01)
USPC ................................ 235/462.25; 235/462.27

(58) Field of Classification Search
USPC ...................................................... 235/462.25
See application file for complete search history.

(56) References Cited

U.S. PATENT DOCUMENTS

| | | | |
|---|---|---|---|
| 4,196,846 A * | 4/1980 | Kao et al. ...................... | 235/475 |
| 5,302,813 A | 4/1994 | Goren | |
| 5,347,121 A * | 9/1994 | Rudeen ........................ | 250/235 |
| 5,396,054 A | 3/1995 | Krichever et al. | |
| 5,449,893 A | 9/1995 | Bridgelall et al. | |
| 5,463,211 A * | 10/1995 | Arends et al. ............. | 235/462.27 |
| 5,734,152 A | 3/1998 | Goren et al. | |
| 5,811,776 A | 9/1998 | Liu | |
| 5,825,006 A | 10/1998 | Longacre, Jr. et al. | |
| 5,854,478 A | 12/1998 | Liu et al. | |
| 5,969,326 A | 10/1999 | Ogami | |
| 6,095,422 A | 8/2000 | Ogami | |

(Continued)

OTHER PUBLICATIONS

Feb. 24, 2012 Search Report in European Application No. 11189182.6.

*Primary Examiner* — Christopher Stanford
(74) *Attorney, Agent, or Firm* — Additon, Higgins & Pendleton, P.A.

(57) ABSTRACT

An optical reader for decoding an encoded symbol character of a symbology includes a scan data signal processor having as an input a scan data signal encoding information representative of the encoded symbol character. The scan data signal processor includes a first time delay stage adapted to provide a primary phase waveform from the scan data signal, a second time delay stage adapted to provide an early phase waveform from the scan data signal, and a third time delay stage adapted to provide a delayed phase waveform from the scan data signal. The early phase waveform has a propagation delay less than the primary phase waveform, and the delayed phase waveform has a propagation delay greater than the primary phase waveform. The scan data signal processor further includes a peak window detection stage for generating a peak window timeframe when an amplitude of the primary phase waveform is greater than, less than, or equal to both an amplitude of the early phase waveform and the delayed phase waveform. The optical reader further includes a digitizer circuit adapted to accept, within the peak window timeframe, the scan data signal processor output.

22 Claims, 5 Drawing Sheets

(56) References Cited

U.S. PATENT DOCUMENTS

| | | |
|---|---|---|
| 6,170,749 B1 | 1/2001 | Goren et al. |
| 6,209,789 B1 | 4/2001 | Amundsen et al. |
| 6,343,741 B1 | 2/2002 | Arends et al. |
| 6,629,640 B2 | 10/2003 | Dorris et al. |
| 6,834,806 B2 | 12/2004 | Benedetti |
| 6,978,937 B2 | 12/2005 | Iwaguchi et al. |
| 7,055,745 B2 | 6/2006 | Dorris et al. |
| 7,093,763 B1 | 8/2006 | Magej |
| 7,124,948 B2 | 10/2006 | Longacre, Jr. et al. |
| 7,147,159 B2 | 12/2006 | Longacre, Jr. et al. |
| 7,216,811 B2 | 5/2007 | Kolstad et al. |
| 7,219,841 B2 | 5/2007 | Biss et al. |
| 7,275,694 B2 | 10/2007 | Longacre, Jr. |
| 7,398,929 B2 | 7/2008 | Longacre, Jr. et al. |
| 7,428,999 B2 | 9/2008 | Barkan |
| 7,506,816 B2 | 3/2009 | Olmstead |

\* cited by examiner

BARCODE READER WITH EDGE DETECTION ENHANCEMENT

FIELD OF THE INVENTION

This disclosure relates generally to processing analog scan data signals generated from barcode symbol reading systems and, more specifically, to a circuit and method for enhanced barcode edge detection.

BACKGROUND OF THE INVENTION

Various optical scanning apparatus such as laser barcode scanners are widely used in diverse environments for purposes of object identification, data-entry and the like. The scanning apparatus have been developed to read and decode optical indicia, such as barcode symbols, that are attached, printed or otherwise fixed to the object to be identified. During operation of such apparatus, a focused light beam is produced from a light source such as a visible laser diode (VLD), and repeatedly scanned across the elements of the code symbol. In the case of barcode scanning applications, the elements of the code symbol consists of a series of bar and space elements of varying width. For discrimination purposes, the bars and spaces have different light reflectivity (e.g., the spaces are highly light-reflective while the bars are highly light-absorptive). As the laser beam is scanned across the barcode elements, the bar elements absorb a substantial portion of the laser beam power, whereas the space elements reflect a substantial portion of the laser beam power. As a result of this scanning process, the intensity of the laser beam is modulated in accordance with the information structure encoded within the scanned barcode symbol.

As the laser beam is scanned across the barcode symbol, a portion of the reflected light beam is collected by optics within the scanner. The collected light signal is subsequently focused upon a photodetector within the scanner which, in one example, generates an analog electrical output signal which can be decomposed into a number of signal components, namely: a digital scan data signal having first and second signal levels, corresponding to the bars and spaces within the scanned code symbol; ambient-light noise produced as a result of ambient light collected by the light collection optics of the system; thermal noise produced as a result of thermal activity within the signal detecting and processing circuitry; and "paper" or substrate noise, which may be produced as a result of the microstructure of the substrate in relation to the cross-sectional dimensions of the focused laser scanning beam, or noise related to the barcode printing quality (e.g., barcode edge roughness, unwanted spots, void defects, and/or printing contrast).

The analog scan data signal has positive-going transitions and negative-going transitions which signify transitions between bars and spaces in the scanned barcode symbol. However, a result of such noise components or operating the scanner near the operational limits of the focal zones, the transitions from the first signal level to the second signal level and vice versa are not perfectly sharp, or instantaneous. Consequently, it is sometimes difficult to determine the exact instant that each binary signal level transition occurs in the detected analog scan data signal.

The ability of a scanner to accurately scan an encoded symbol character and accurately produce digital scan data signals representative of a scanned barcode symbol in noisy environments depends on the depth of modulation of the laser scanning beam. The depth of modulation of the laser scanning beam, in turn, depends on several important factors. Among the factors are (i) the ratio of the laser beam cross-sectional dimensions at the scanning plane to the width of the minimal barcode element in the barcode symbol being scanned; (ii) the signal-to-noise ratio (SNR) in the scan data signal processor at the stage where binary level (1-bit) analog to digital (A/D) signal conversion occurs; (iii) the object distance; and (iv) the field of view (FOV) angle.

As a practical matter, it is not possible in most instances to produce analog scan data signals with precisely-defined signal level transitions. Therefore, the analog scan data signal must be further processed to precisely determine the point at which the signal level transitions occur. Various circuits have been developed for carrying out such scan data signal processing operations. Typically, signal processing circuits capable of performing such operations include filters for removing unwanted noise components, and signal thresholding devices for rejecting signal components which do not exceed a predetermined signal level. One drawback to these approaches is that thermal and "paper" (or substrate) noise imparted to the analog scan data input signal tends to generate "false" positive-going and negative-going transitions in the first derivative signal, and may also generate zero-crossings in the second-derivative signal. Consequently, the circuit logic allows "false" first derivative peak signals and second-derivative zero-crossing signals to be passed on, thereby producing erroneous binary signal levels at the output stage of the signal processor. In turn, error-ridden digital data scan data signals are transmitted to the digital scan data signal processor of the barcode scanner for conversion into digital words representative of the length of the binary signal levels in the digital scan data signal. This can result in significant errors during barcode symbol decoding operations, causing objects to be incorrectly identified and/or erroneous data to be entered into a host system.

SUMMARY OF THE INVENTION

In one aspect of the disclosure, an optical reader for decoding an encoded symbol character of a symbology includes a laser source for generating a laser beam along an optical path, and a lens assembly for focusing the laser beam on the encoded symbol character at a plane of focus. A scanning mechanism for oscillating the laser beam at a pre-determined frequency sweeps over the encoded symbol character according to a pre-described scan pattern. The optical reader further includes a photodetector having as an input detected light intensity corresponding to the laser beam scattered off the scanned encoded symbol character. The optical reader outputs a scan data signal encoding information representative of the encoded symbol character.

The optical reader further includes a scan data signal processor having an input and an output. The scan data signal processor includes a first time delay stage adapted to provide a primary phase waveform from the scan data signal, a second time delay stage adapted to provide an early phase waveform from the scan data signal, and a third time delay stage adapted to provide a delayed phase waveform from the scan data signal. The early phase waveform has a propagation delay less than the primary phase waveform, and the delayed phase waveform has a propagation delay greater than the primary phase waveform. The scan data signal processor further includes a peak window detection stage for generating a peak window timeframe when an amplitude of the primary phase waveform is greater than, less than, or equal to both an amplitude of the early phase waveform and the delayed phase waveform. The optical reader further includes a digitizer circuit adapted to accept, within the peak window timeframe, the scan data signal processor output.

In another aspect of the disclosure, a method for processing scan data in an optical reader is disclosed. The method includes the step of providing a laser source within a housing for generating a laser beam along an optical path, a lens assembly for focusing the laser beam on an encoded symbol character, and a photodetector for detecting light intensity corresponding to the laser beam scattered off the scanned encoded symbol character and generating a scan data signal encoding information representative of the encoded symbol character.

The method further includes the steps of generating from the scan data signal a primary phase waveform having a nominal propagation delay, an early phase waveform having a waveform propagation delay less than the nominal propagation delay of the primary phase waveform, and a delayed phase waveform having a waveform propagation delay greater than the nominal propagation delay of the primary phase waveform. The amplitude of the primary phase waveform is compared with the amplitude of the early phase waveform and the amplitude of the delayed phase waveform. If the amplitude of the primary phase waveform is greater than, less than, or equal to both the amplitude of the early phase waveform and the delayed phase waveform, the method further includes the step of generating a peak window timeframe. The method further includes attempting to decode the encoded symbol character during the peak window timeframe.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The present invention provides an apparatus and method for decoding optical indicia, such as barcodes, that more effectively distinguishes between actual barcode elements and signal noise. As will be explained in greater detail below, an optical reader or imager that is used to "read" an indicium will not always obtain a sharp representation of the barcode symbol due to optical, environmental, and physical factors. Common causes for a distorted signal include the barcode being at a position beyond the far depth of field limit (e.g., out of focus), the barcode may be poorly illuminated so the contrast between black and white is not distinct, or the signal includes paper or substrate noise. Substrate noise is present because the barcode substrate is usually paper, and the laser light is scattered off the fibers having a random spatial structure. Additionally, aperture is an important controlling factor in laser beam shaping. However, aperture truncation resulting from beam shaping causes the beam to lose its Gaussian characteristics. As a result, side lobes can be observed in some beam profiles. The side lobes may cause an incorrect waveform to be generated by flip-flop or latch-based binary digitizers.

Using conventional decoding systems and methods, the reader will in most situations interpret a rise or fall in the photodetector signal voltage as an indication of the beginning or end of a bar/space pattern. This in turn triggers other actions within the reader logic, such as obtaining first and second derivatives of the analog signal, measuring the bar/space widths, digitizing the information, and passing it to the decoder. However, if the rise or fall in the photodetector signal voltage is due to substrate noise or other factors mentioned above, the reader will still perform the triggered tasks such as taking derivatives and determining bar/space widths, but will ultimately fail to provide a suitable decoded signal. This wastes valuable processor time and power.

"Encoded symbol character" is intended to denote a representation of a unit of information in a message, such as the representation in a barcode symbology of a single alphanumeric character. One or more encoded symbol characters can be used to convey information, such as the identification of the source and the model of a product, for example in a UPC barcode that comprises 12 encoded symbol characters representing numerical digits. Also, an encoded symbol character may be a non-alphanumeric character that has an agreed upon conventional meaning, such as the elements comprising bars and spaces that are used to denote the start, the end, and the center of a UPC barcode. The bars and spaces used to encode a character as an encoded symbol are referred to generally as "elements." For example an encoded character in a UPC symbol consists of 4 elements, 2 bars and 2 spaces. Similarly, encoded symbol characters can be defined for other barcode symbologies, such as other one-dimensional ("1-D") barcode systems, and for two-dimensional ("2-D") barcode systems (for example, PDF417 or Aztec).

Figure 1:
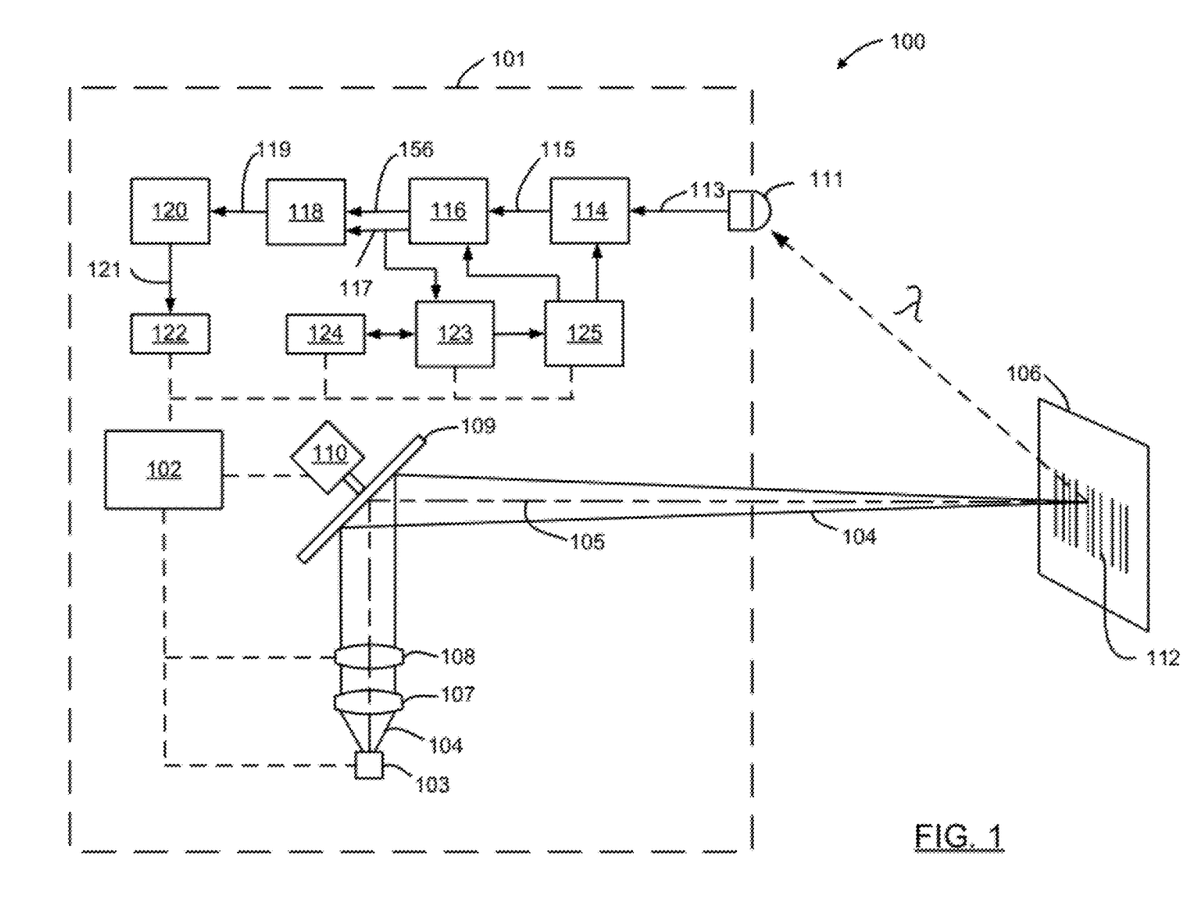
FIG. 1 is a schematic diagram of an optical reader according to one embodiment of the invention.

Referring to FIG. 1, there is provided an optical reader 100 that in one embodiment comprises a laser scanning system. The optical reader 100 may include a housing 101 comprising a number of subcomponents including a system controller 102, realized as a programmed microcontroller, and a laser source 103 aligned so as to generate a laser beam 104 of sufficient power along an optical path, or axis 105, to illuminate a target 106. The laser source 103 may be realized as a visible laser diode (VLD), for example. The laser beam 104 may be transmitted through a collimating lens 107, a lens assembly 108, and reflect off a scanning mechanism 109. The collimating lens 107 produces a focused beam of light. In the disclosed example, the collimating lens 107 is disposed between the laser source 103 and the scanning mechanism 109, but the lens may be placed at any advantageous location along the axis 105. In one embodiment, the collimating lens 107 is included as part of the assembly of the laser source 103. The collimating lens 107 is chosen by the manufacturer of the optical reader 100 according to the particular requirements of the design. In one embodiment, the lens assembly 108 is a variable focus lens assembly realizable using movable optical components translated relative to each other in real-time manner in response to control signals produced by the system controller 102, so as to vary the focal distance of the laser beam 104 at different focal planes (e.g., focal zones) within the system during laser scanning operations. In one example, the curvature of the lens is varied depending on an applied voltage or mechanical actuation.

The scanning mechanism 109 reflects the emitted laser beam 104 incident thereon and aligns it to the target 106. Further, the scanning mechanism 109 oscillates at a predetermined frequency to sweep the beam 104 over the target 106 according to a pre-described scan pattern. The scan pattern may be along a line transverse to the plane of the target, e.g., a side-to-side motion. In some instances, an orthogonal scanning mechanism is added to allow raster scanning. In some embodiments, the oscillation motion of the scanning mechanism 109 may be driven by a motor 110.

The optical reader 100 further includes a photodetector 111 for detecting the intensity of laser light scattered off a scanned encoded symbol character 112, such as a barcode symbol, and producing an electrical analog scan data signal 113 corresponding to the structure of the scanned encoded symbol character. In the disclosed embodiment, the collection optics include a non-retrodirective optical arrangement wherein the scanning mirror 109 is a micro-electrical mechanical system (MEMS), and the photodetector 111 includes an optical filter and collection optics. Other configurations are possible, such as retrodirective optical arrangements comprising an oscillating minor to deflect the outgoing laser beam to the target 16 and also deflect the reflected light onto the photodetector 111.

The optical reader 100 further includes a preamplification circuit 114 for preamplifying the analog scan data signal produced by the photodetector 111. The function of the preamplification circuit 114 is to increase the voltage separation between the two levels of the input analog scan data signal 113 corresponding to the bars and spaces of the encoded symbol character 112. The preamplified analog scan data signal 115 is processed by a scan data signal processor 116 which may generate a digital scan data signal 117 corresponding to the analog scan data signal provided as input thereto. As will be explained in detail below, the scan data signal processor 116 may perform conditioning such as taking first and second derivatives of the signal, and outputting to a digitizer circuit 118. The digitizer circuit 118 produces digital words 119 representative of the time duration of the first and second signal levels in the digital scan data signal 117. A decode processor 120 processes the digital words 119 produced from the digitizer circuit 118 using decode tables or maximum likelihood decoder algorithms so as to decode the digital scan data signal and produce a symbol character data string representative of the corresponding laser-scanned encoded symbol character. A successfully decoded signal 121 outputs to a readout device 122, which in one example is a display window on the scanner housing 101.

The optical reader 100 may include a real-time barcode element width measurement processor (e.g., programmed microprocessor) 123. The element width measurement processor 123 provides real-time measurement of the first and second binary signal levels occurring in the digital scan data signal 117 as an encoded symbol character is scanned at different focal planes (or zones) within the system. The processor 123 then provides a real-time comparison with predetermined time duration measurements stored in a beam spot speed look-up table, for example realized using erasable programmable read only memory (EPROM) or like memory structures 124, so as to determine the corresponding laser beam spot speed that would produce such measured time durations for an encoded symbol character of a particular resolution, scanned at a particular focal plane in the system. A pass-band filter control signal generator (e.g., programmed microprocessor) 125 may be utilized to producing variable pass band control signals based on the determined beam spot speed of the laser scanning beam (at each particular instant in time), and providing such control signals to the preamplification circuit 114, and the first and second derivative signal band-pass filters and amplifiers employed in the scan data signal processor 116.

Figure 2:
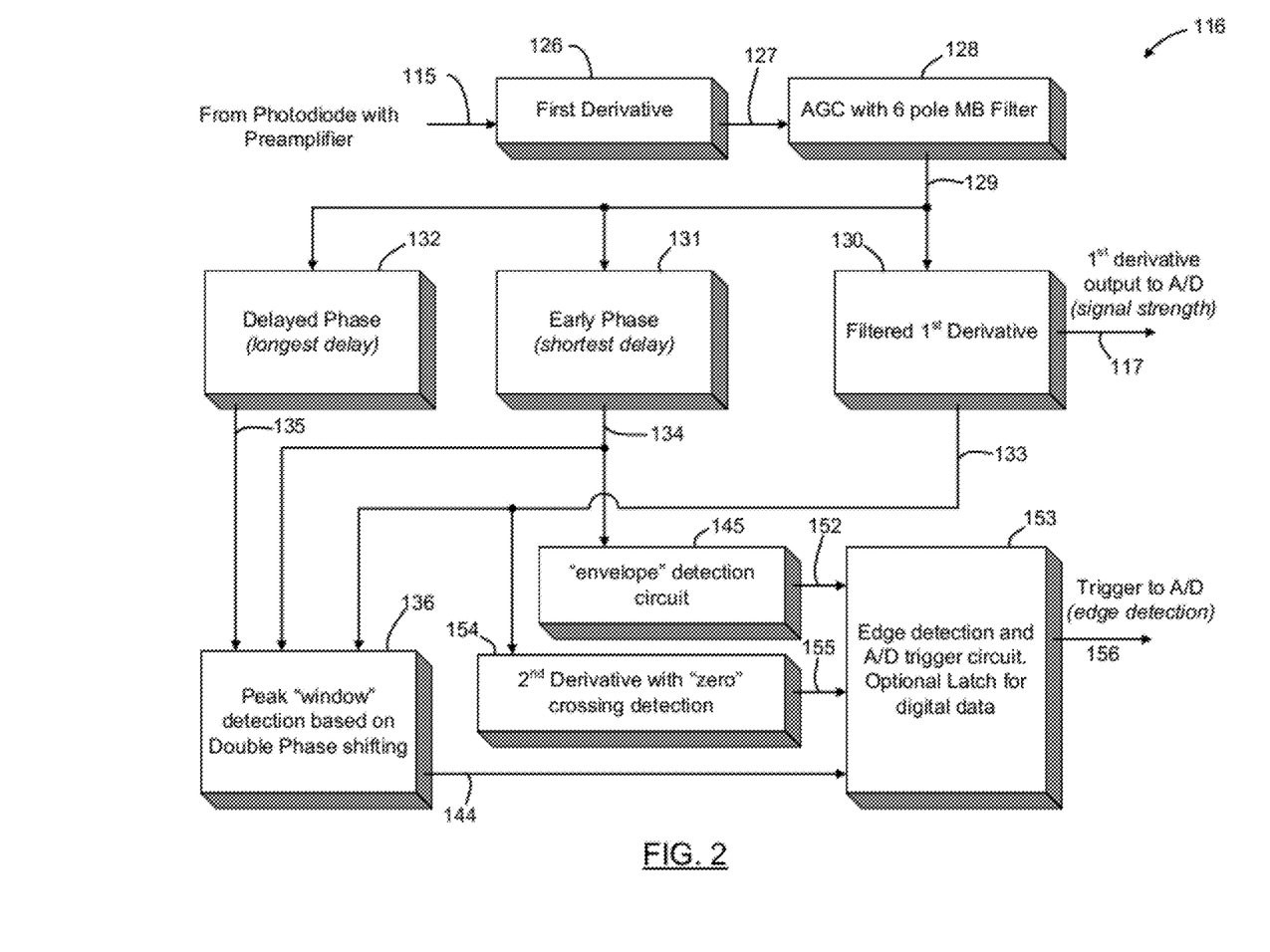
FIG. 2 is a block schematic diagram of the scan data signal processor within the optical reader of FIG. 1.

FIG. 2 shows a function block diagram of the scan data signal processor 116 in greater detail according to one embodiment of the invention. The signal processor 116 is designed and configured to more accurately detect the edge of a valid barcode symbol. The signal processor 116 includes a first derivative signal generation stage 126 having as an input the preamplified analog scan data signal 115. A first derivative output signal 127 serves as an input to an automatic gain control (AGC) and filter circuit 128, which functions to normalize the peak levels of the various input signals to the same basic amplitude. The input peak levels vary according to such factors as the contrast between bar/space elements, and the distance of the barcode from the reader, for example. In one embodiment, the AGC circuit 128 may be realized as a six-pole modified Butterworth circuit having three stages of op amps creating a 5 volt peak output, regardless of the input amplitude.

The output 129 from the AGC circuit 128 splits into three paths differing only in phase shift. In one example, the phase shift is realized by passing the output 129 through three unique filtering stages, resulting in three identical signals differing only in phase. A first time delay stage 130 is typical for circuits in the art and outputs a primary phase or nominal waveform having a baseline propagation delay. In one example, the first time delay stage 130 provide a propagation delay of approximately 0.004 milliseconds. A second time delay stage 131 delays the AGC output 129 less than the primary phase or nominal delay from the first time delay stage 130. Thus, the second time delay stage 131 comprises the shortest delay and may be characterized as an "early phase stage" relative the nominal or primary phase signal. The propagation delay may be tailored to suit the particular application, but in the disclosed embodiment the propagation delay is approximately 0.002 milliseconds less than that of the primary phase waveform. A third time delay stage 132 delays the AGC output 129 more than the primary phase or nominal delay from the first time delay stage 130. Thus, the third time delay stage 132 comprises the longest delay and may be characterized as a "delayed phase stage" relative the nominal or primary phase signal. In the disclosed embodiment the propagation delay for the delayed phase waveform 135 is approximately 0.002 milliseconds greater than that of the primary phase waveform. In one example, each time delay stage 130, 131, 132 may be realized by a separate Bessel filter that gives a uniform propagation delay through the bandwidth of the frequency range of the laser light scattered off the scanned encoded symbol character. The actual delay time may vary somewhat, depending upon the specific barcode scanner design and application. Factors affecting actual delay time include and the raising and falling slopes of the waveform, which is the result of scan angle (e.g., field of view); scan frequency; barcode distance; barcode element width; and system (e.g., optics, detector, and circuit) bandwidth.

Figure 3:
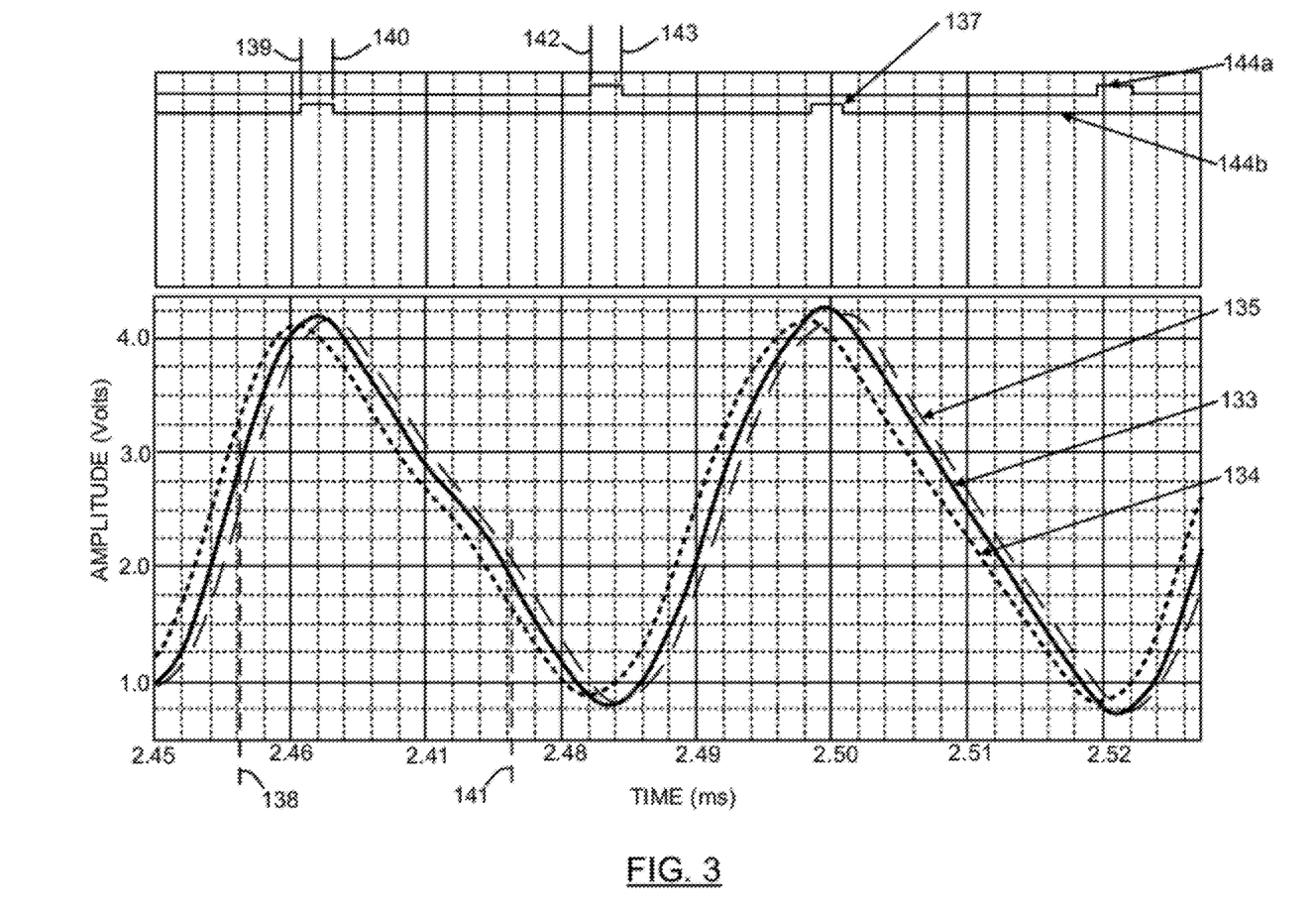
FIG. 3 illustrates graphical representations of signal traces generated by the optical reader of FIG. 1 according to one embodiment of the invention.

The respective outputs from the first time delay stage 130, the second time delay stage 131, and the third time delay stage 132 may be better understood with reference to FIGS. 2 and 3. A primary phase waveform 133 having a nominal time delay is illustrated as a solid line in FIG. 3. In the illustrated example, the waveform 133 is shown in a very short time duration, approximately 0.08 milliseconds. The waveform 133 represents the first derivative of the filtered and amplified analog signal output from the photodetector 111 in response to scanning the laser beam 104 across the encoded symbol character 112 (FIG. 1). The positive-going peaks of the waveform 133 indicate a rate of increase in the transition between light and dark bar/space barcode elements, and the negative-going valleys indicate a rate of decrease in the transition between light and dark bar/space barcode elements. Therefore, the positive peak of the waveform may indicate the beginning or leading edge of a bar element, and the negative valley may indicate the end or trailing edge of the element. The waveform 133 appears sinusoidal, as may be the case when the frequency range of the laser light scattered off the scanned encoded symbol character 112 is close to the high frequency limit of operation for the optical reader 100. Under perfect scanning conditions, the first derivative waveform would appear as a square wave. Therefore, in reality, the primary phase waveform 133 may assume a shape anywhere in the spectrum between sinusoidal and square wave.

Still referring to FIG. 3, an early phase waveform 134 is represented by the short dashed line. The early phase waveform 134 is identical to the primary phase waveform 133 except that the propagation delay set by the second time delay stage 131 is shorter. Similarly, a delayed phase waveform 135 is represented by the long dashed line, and is identical to the primary phase waveform 133 except that the propagation delay set by the third time delay stage 132 is longer.

Referring to FIGS. 2-3, the scan data signal processor 116 may further include a peak window detection stage 136 to determine the amplitude peaks and valleys of the primary phase waveform 133. The peak window detection stage 136 generates a peak window 137 timeframe, during which edge detection and other decoding functions may be carried out. Outside the peak window 137 timeframe, the signal is most likely not indicative of a barcode edge, so the optical reader 100 refrains from edge detection and other decoding functions, thereby saving valuable processing power. In one embodiment, the peak window detection stage 136 is realized as an analog circuit having cascaded comparators configured to detect the beginning and end to a peak (or valley) of the waveform.

The peak window 137 may "open" for the primary phase waveform 133 when, at any given time period, the amplitude of the primary phase waveform 133 is greater than or equal to both the amplitude of the early phase waveform 134 and the delayed phase waveform 135. Referring to FIG. 3, at time point 138 the peak window does not meet the "open" criteria because the amplitude of the primary phase waveform 133 is less than that of the early phase waveform 134. However, at time point 139 the peak window opens because the amplitude of the primary phase waveform 133 is equal to the early phase waveform 134 and greater than the delayed phase waveform 135. At any time period until time point 140 the peak window condition is met. At time point 140, the amplitude of the primary phase waveform 133 drops below that of the delayed phase waveform 135, and the peak window "closes."

The peak window 137 may also "open" for the primary phase waveform 133 when, at any given time period, the amplitude of the primary phase waveform 133 is less than or equal to both the amplitude of the early phase waveform 134 and the delayed phase waveform 135. Still referring to FIG. 3, at time point 141 the peak window does not meet the "open" criteria because the amplitude of the primary phase waveform 133 is not less than or equal to that of the early phase waveform 134. However, at time point 142 the peak window opens because the amplitude of the primary phase waveform 133 is equal to the early phase waveform 134 and less than the delayed phase waveform 135. At any time period until time point 143, the peak window condition is satisfied. At time point 143, the amplitude of the primary phase waveform 133 increases above that of the delayed phase waveform 135, and the peak window "closes."

Accordingly, the disclosed steps describe a method for accurately identifying peaks (either positive or negative) in the derivative waveform with great precision, which may be indications of the leading or trailing edge of an encoded symbol character. The described steps of generating early and delayed phase waveforms and then comparing them with a primary phase waveform to identify peaks in the primary phase waveform may also be utilized with the original analog signal, the amplified/filtered signal, or a second derivative signal. One skilled in the art could select appropriate analog circuits, such as comparators, to accomplish the steps for other waveforms. Further, the method and apparatus described hereinabove could be adapted for use with digital circuits without departing from the scope of the invention.

In one embodiment, the scan data signal processor 116 may generate a digital signal 144 or trigger upon the opening and closing of the peak window 137. In one example, the digital signal 144 is a single-bit output as shown in FIG. 3. The trace illustrated by 144a depicts the negative peak window, which assumes a logic low level when the peak window 137 is closed and assumes a logic high level when the peak window opens. The signal 144a resets to the logic low level when the peak window 137 closes. Similarly, the trace illustrated by 144b depicts the positive peak window, which assumes a logic low level when the peak window 137 is closed and assumes a logic high level when the peak window opens. The signal 144b resets to the logic low level when the peak window 137 closes.

The peak window detection stage 136 detects every single peak and valley in the signal, including noise (albeit for a much shorter time duration). Although the detection stage 136 limits the timeframe that edge detection and other decoding functions are performed, there may still be a large amount of data to process because of the large number of trigger signals 144 generated at every peak or valley. Referring back to FIG. 2, the scan data signal processor 116 may further include an envelope detection stage 145 to assist in deciphering when a waveform peak or valley is actually a barcode edge, or simply signal noise. The envelope detection stage 145 creates a timeframe or envelope inside which the primary phase waveform 133 may be analyzed. Unlike the peak window, which isolates a peak or valley of the waveform, the envelope window includes the entire waveform within a criterion timeframe. In one embodiment, the criterion timeframe is that period of time that the amplitude of the derivative signal exceeds a threshold value. Usually, higher amplitude peaks and valleys indicate an actual barcode, while lower amplitudes may indicate specular noise or electrical noise. Therefore, a threshold signal amplitude may be defined below which the trigger signals 144 will be ignored. Stated another way, the threshold signal amplitude may define a band centered about the nominal or average amplitude of the oscillating waveform. The threshold signal amplitude defines upper and lower limits, such that the envelope window opens when the amplitude of the waveform exceeds the upper or lower limit. In one example, the threshold signal amplitude may be half the value of the expected peak amplitude. In another example, the threshold signal amplitude may be slightly higher than the calculated measured noise that is expected in the particular kind of optical reader. In yet another example, the threshold determination is based on a histogram analysis of the waveform samples. The threshold is picked at the minimum between the high amplitude sample distribution and low amplitude sample distribution on the histogram.

The derivative signal or primary phase waveform 133 oscillates from peak to valley at a frequency related to the various factors such as type of laser, and barcode distance from optical scanner. As a result, the peak detection envelope opens and closes every time the amplitude drops below the threshold value. The inventors have determined that once the peak detection envelope opens, meaning both the peak window is open and the threshold criteria have been satisfied, the trigger stage 153 would perform better if waveform oscillations could be minimized so the peak detection envelope remained open until the optical reader fully passed the barcode element. To solve this problem, the inventors incorporated a waveform smoothing element to the envelope detection stage 145. In one example, the waveform smoothing element comprises a diode and capacitor arrangement. The analog primary phase waveform 133 passes through the diode in one direction and charges the capacitor. The charge from the capacitor decays at a predetermined rate, for example much slower than the frequency of the primary phase waveform 133 oscillations, and therefore maintains the amplitude long enough to meet the next peak in the primary phase waveform. In this manner, the signal can be used to trigger the opening and closing of the peak detection envelope, as will be explained below. The peak detection envelope remains open even if the amplitude of the actual signal 133 falls below the threshold value, and remains open until the amplitude drops for a time period greater than the decay rate.

Figure 4:
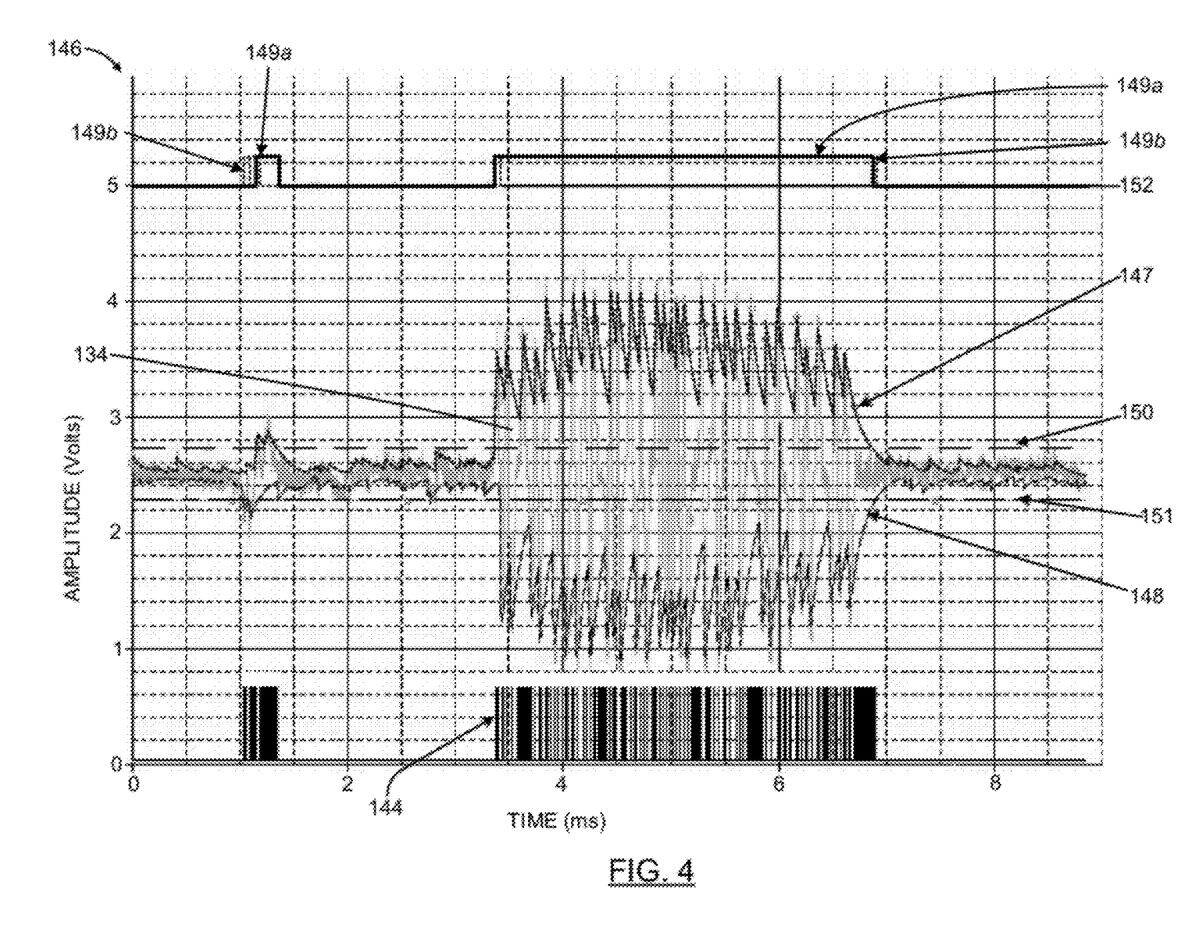
FIG. 4 illustrates graphical representations of signal traces generated by the optical reader of FIG. 1 according to another embodiment of the invention.

FIG. 4 is a composite plot 146 illustrating the principles described hereinabove according to one embodiment of the invention, observed over a time duration of approximately 9 milliseconds. The plot 146 includes a graphical representation of the first derivative early phase waveform 134 generated from the scanned encoded symbol character 112 by the optical reader 100 (FIG. 1). Overlaid on the waveform 134 is a positive envelope input signal 147 and a negative envelope input signal 148 output from the envelope detection stage 145. The signals 147, 148 are used in determining whether an envelope window 149 should be open or closed. As described in one embodiment above, the early phase waveform 134 passes through diodes and capacitors to hold their respective peak values in the manner shown. The signals 147, 148 are compared to an upper peak threshold 150 and a lower peak threshold 151, respectively. If the amplitude of the positive envelope input signal 147 exceeds the upper threshold 150, the upper envelope window 149a opens, indicated by the solid line. If the amplitude of the negative envelope input signal 148 exceeds the lower threshold 151, the lower envelope window 149b opens, indicated by the dashed line. In one embodiment, a 1-bit digital signal 152 is generated that assumes a logic low level when the envelope window is closed and assumes a logic high level when the envelope window opens (e.g., if either of the upper envelope window 149a or the lower envelope window 149b is open).

In one embodiment of the present invention, when the envelope window digital signal 152 assumes a logic high level, the peak window digital signal 144 is passed to the next stage. Otherwise, the peak window digital signal 144 is assumed to be reporting noise and is suppressed. Suppressing the data that is unlikely to be an actual barcode saves decoding processing power and time. Graphically, this concept is illustrated at the bottom of FIG. 4, wherein the digital signal 144 assumes a logic low level when the envelope window 149 is closed.

Referring back to FIG. 2, the digital signal 144 output from the peak window detection stage 136 and the envelope digital signal 152 output from the envelope detection stage 145 may serve as input for an edge detection and analog-to-digital (A/D) trigger stage 153. The edge detection information may be obtained from a second derivative stage 154 which in one example processes the first derivative primary phase waveform 133 to obtain a second derivative waveform (not shown). The point in time where the second derivative waveform crosses virtual zero may form the basis for a zero crossing indicator 155, which is indicative of the edge of the barcode bar or space. Additionally, the strength or amplitude of the second derivative waveform may be included in the signal 155 passed to the trigger stage 153. The strength information may be passed as an 8-bit digital signal, in one example, and may serve as input to a likelihood decoder, wherein a stronger signal indicates a greater likelihood of an actual barcode edge.

The two inputs 144, 152 and the zero crossing indicator 155 may together form inputs to a trigger signal 156 or latch to the digitizer circuit 118. In one embodiment of the present invention, the trigger signal 156 activates only when the envelope window 149 assumes a logic high level (e.g., the amplitude of the first derivative signal is above the peak threshold value). The trigger signal 156 causes the digital scan data signal 117 to be passed to the digitizer circuit 118, however the only data passed conforms to the data within the timeframe of the peak window 144. In this manner, only a small fraction of the derivative signal is passed for digitizing, and the small fraction includes only the data at the peak of the waveform.

Figure 5:
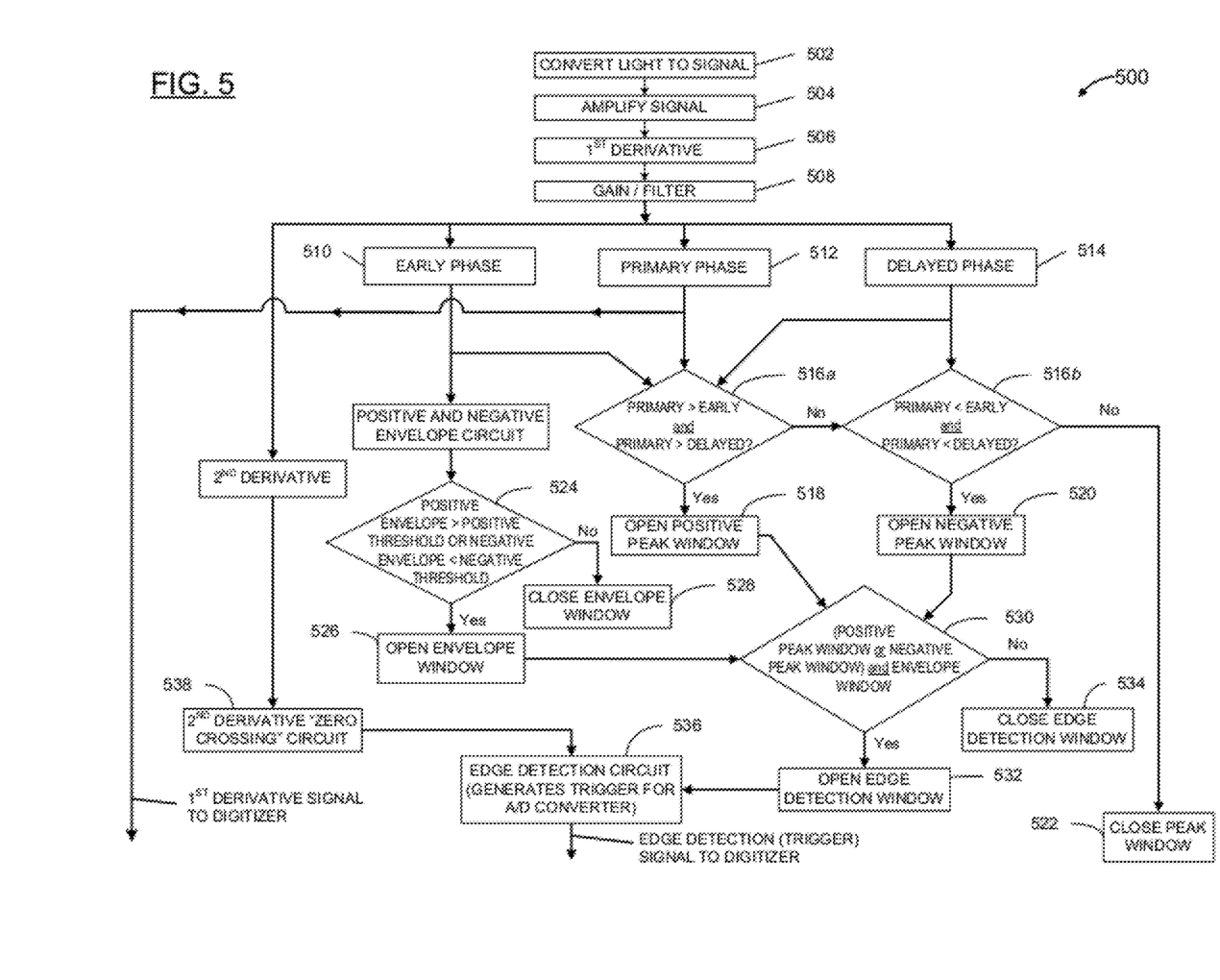
FIG. 5 is a block diagram of a method for processing scan data in an optical reader according to an embodiment of the invention.

FIG. 5 shows a method 500 for processing scan data in accordance with one embodiment of the invention. The method 500 includes a step 502 of detecting the intensity of laser light reflected off the scanned encoded symbol character 112 and producing a scan data signal 113 corresponding to the structure of the scanned encoded symbol character. The step 502 may be realized by the photodetector 111, described with reference to FIG. 1, generating an electrical analog signal. The method 500 further includes a step 504 of preamplifying the signal output from the photodetector 111. Typical photodectors used in optical readers output an analog signal in the millivolt range, and the amplification step 504 may be utilized to increase the output by several orders of magnitude. The preamplification step 504 may be realized by the preamplification circuit 114 disclosed with reference to FIG. 1.

The method 500 for processing analog scan data further includes a step 506 of taking a first derivative of the scan data signal 115. The amplitude of the derivative signal, which represents the slope of the signal, provides indications of transitions in the original signal. Positive peaks of the first derivative signal may provide a strong indication that the signal is transitioning from lighter to darker area of the barcode, and negative peaks may provide a strongest indication that the signal is transitioning from darker to lighter area of the barcode. However, due to the factors explained above, such as substrate, environmental, or optical noise, not all peaks in the first derivative signal are indicative of a bar-space transition or a space-bar transition. The noise present in the signal may provide false indications of a bar-space transition.

The method 500 may further include a step 508 to provide a gain and filter to the first derivative signal. In one example, the gain and filter is provided by an automatic gain control (AGC) and filter circuit such as that disclosed with reference to element 128. The method 500 further includes splitting the signal into identical waveforms and applying different phase-delays to selective waveforms. At a step 510, a short delay is applied to the original waveform to produce an early phase waveform. At a step 512, a longer time delay is applied to the original waveform to produce the primary phase (or baseline) waveform. The delay of the early phase waveform is less than the delay of the primary phase waveform. At a step 514, an even longer time delay is applied to the original waveform to produce a delayed phase waveform. The delay of the delayed phase waveform is greater than the delay of the primary waveform.

The method 500 further includes a peak comparator step 516, which may be realized by the peak window detection stage 136, wherein the amplitude of the primary phase (or baseline) waveform is compared to the early phase waveform and the delayed phase waveform. If the amplitude of the primary phase waveform is greater than or equal to both the amplitude of the early phase waveform and the delayed phase waveform, as shown at a step 516a, a positive peak window opens at step 518. If the amplitude of the primary phase waveform is less than or equal to both the amplitude of the early phase waveform and the delayed phase waveform, as shown at a step 516b, a negative peak window opens at step 520. If neither of the conditions are met, the peak window closes or remains closed at a step 522.

The method 500 may further include a threshold comparator step 524, which may be realized by the envelope detection stage 145 as described herein, wherein the amplitude of the positive envelope input signal 147 and negative envelope input signal 148 is compared to a threshold value and, if the amplitude is greater than the upper threshold 150 or less than the lower peak threshold 151, the envelope window 149 opens at a step 526. The envelope window 149 may remain open longer than the duration of the waveform amplitude exceeding the threshold value by manipulating the waveform with diodes, capacitors and the like, as explained hereinabove. If the threshold condition is not met, the envelope window closes or remains closed at a step 528.

In one embodiment of the invention, the method 500 includes a step 530 of sending the analog information to a digitizer for decoding if the positive or negative peak window is open. In another embodiment of the invention, the step 530 of sending the analog information to a digitizer for decoding is carried out if, additionally, the envelope window is open. As illustrated in FIG. 5, an edge detection window opens at a step 532 and an edge detection trigger signal is sent to the digitizer circuit at a step 536 if the positive peak window or negative peak window is open (as directed by steps 518 and 520, respectively), and the threshold envelop window is open (as directed by step 526). If the comparator criteria were not met, the edge detection window closes or remains closed at a step 534. The comparator step 530 may be realized by the trigger stage 153 as described herein, in one example.

The method 500 may further include a step 538 wherein a second derivative stage processes the primary phase waveform to obtain a second derivative waveform. Data from the second derivative waveform such as zero crossings may be passed to the digitizer in step 536 for subsequent decoding.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. An optical reader for decoding an encoded symbol character of a symbology, the optical reader comprising:
   a laser source for generating a laser beam along an optical path;
   a lens assembly for focusing the laser beam on the encoded symbol character at a plane of focus;
   a scanning mechanism for oscillating the laser beam at a pre-determined frequency to sweep over the encoded symbol character according to a pre-described scan pattern;
   a photodetector having as an input detected light intensity corresponding to the laser beam scattered off the scanned encoded symbol character, and having as an output a scan data signal encoding information representative of the encoded symbol character; and
   a scan data signal processor having an input and an output, the scan data signal processor comprising a first time delay stage adapted to provide a primary phase waveform from the scan data signal, a second time delay stage adapted to provide an early phase waveform from the scan data signal, the early phase waveform having a propagation delay less than the primary phase waveform, and a third time delay stage adapted to provide a delayed phase waveform from the scan data signal, the delayed phase waveform having a propagation delay greater than the primary phase waveform, the scan data signal processor further comprising a peak window detection stage for generating a positive peak window timeframe, the positive peak window timeframe only opening when an amplitude of the primary phase waveform is greater than or equal to both an amplitude of the early phase waveform and the delayed phase waveform and the positive peak window timeframe closing only when either (i) the amplitude of the primary phase waveform is less than an amplitude of the early phase waveform or (ii) the amplitude of the primary phase waveform is less than an amplitude of the delayed phase waveform; and
   a digitizer circuit adapted to accept, after the positive peak window timeframe, the scan data signal processor output.

2. The optical reader of claim 1, wherein the input to the scan data signal processor is an electrical analog scan data signal, and the output is a digital scan data signal.

3. The optical reader of claim 2, wherein the analog scan data signal is preamplified.

4. The optical reader of claim 2, wherein the analog scan data signal is a first derivative output signal.

5. The optical reader of claim 1, further comprising an envelope detection stage defining a criterion timeframe inside which the scan data signal processor output is passed to the digitizer.

6. The optical reader of claim 5, wherein the criterion timeframe is that period of time that the amplitude of a waveform exceeds a threshold signal amplitude.

7. The optical reader of claim 6, wherein the threshold signal amplitude is approximately half the value of an expected peak amplitude.

8. The optical reader of claim 6, wherein the threshold signal amplitude is greater than an amplitude of an expected noise associated with the operation of the optical reader.

9. The optical reader of claim 1, wherein at least one of the first time delay stage, the second time delay stage, and the third time delay stage is a Bessel filter.

10. The optical reader of claim 1, wherein the early phase waveform propagation delay is approximately 0.002 milliseconds less than that of the primary phase waveform propagation delay.

11. The optical reader of claim 1, wherein the delayed phase waveform propagation delay is approximately 0.002 milliseconds greater than that of the primary phase waveform propagation delay.

12. The optical reader of claim 1, further including a second derivative stage for providing a zero crossing indicator to the digitizer circuit.

13. The optical reader of claim 1, wherein the scan data signal processor is realized with digital circuits.

14. A method for processing scan data in an optical reader, comprising the steps of:
providing a laser source within a housing for generating a laser beam along an optical path, a lens assembly for focusing the laser beam on an encoded symbol character, and a photodetector for detecting light intensity corresponding to the laser beam scattered off the scanned encoded symbol character and generating a scan data signal encoding information representative of the encoded symbol character;
generating a primary phase waveform from the scan data signal having a nominal propagation delay;
generating an early phase waveform from the scan data signal having a waveform propagation delay less than the nominal propagation delay of the primary phase waveform;
generating a delayed phase waveform from the scan data signal having a waveform propagation delay greater than the nominal propagation delay of the primary phase waveform;
comparing an amplitude of the primary phase waveform with an amplitude of the early phase waveform and an amplitude of the delayed phase waveform;
generating a positive peak window timeframe, the positive peak window timeframe only opening if the amplitude of the primary phase waveform is greater than or equal to both the amplitude of the early phase waveform and the delayed phase waveform and the positive peak window timeframe closing only if either (i) the amplitude of the primary phase waveform is less than an amplitude of the early phase waveform or (ii) the amplitude of the primary phase waveform is less than an amplitude of the delayed phase waveform; and
attempting to decode the encoded symbol character after the positive peak window timeframe.

15. The method of claim 14, further comprising a step of providing a first derivative signal generation stage for generating a first derivative output signal from the scan data signal, and generating the primary phase waveform, the early phase waveform,
and the delayed phase waveform from the first derivative output signal.

16. The method of claim 14, wherein the step of attempting to decode the scan data signal occurs only during the peak window timeframe.

17. The method of claim 14, further comprising a step of comparing the amplitude of the primary phase waveform with a peak threshold and, if the amplitude exceeds the peak threshold, generating an envelope window timeframe.

18. The method of claim 17, wherein the peak threshold is an upper limit.

19. The method of claim 18, further comprising a step of generating a positive envelope input signal from the amplitude of the primary phase waveform, and generating the envelope window timeframe if an amplitude of the positive envelope input signal exceeds the upper limit peak threshold.

20. The method of claim 17, wherein the peak threshold is a lower limit.

21. The method of claim 20, further comprising a step of generating a negative envelope input signal from the amplitude of the primary phase waveform, and generating the envelope window timeframe if an amplitude of the negative envelope input signal is less than the upper limit peak threshold.

22. The method of claim 17, wherein the step of attempting to decode the scan data signal occurs during the peak window timeframe and the envelope window timeframe.

* * * * *